(12) United States Patent
Vik

(10) Patent No.: US 10,293,461 B2
(45) Date of Patent: May 21, 2019

(54) SYSTEM AND METHOD FOR MANUFACTURING A FACE SEAL WITH CONTROLLED LOAD TOLERANCE

(71) Applicant: CNH Industrial America, LLC, New Holland, PA (US)

(72) Inventor: Brian Vik, Barnesville, MN (US)

(73) Assignee: CNH Industrial America LLC, New Holland, PA (US)

( * ) Notice: Subject to any disclaimer, the term of this patent is extended or adjusted under 35 U.S.C. 154(b) by 387 days.

(21) Appl. No.: 15/141,947

(22) Filed: Apr. 29, 2016

(65) Prior Publication Data

US 2017/0312883 A1   Nov. 2, 2017

(51) Int. Cl.
*B24B 49/16* (2006.01)
*B24B 1/00* (2006.01)
*F16J 15/34* (2006.01)

(52) U.S. Cl.
CPC ............. *B24B 49/16* (2013.01); *B24B 1/00* (2013.01); *F16J 15/344* (2013.01); *F16J 15/3464* (2013.01)

(58) Field of Classification Search
CPC . B24B 1/00; B24B 49/16; F16J 15/344; F16J 15/3464
USPC .................................... 451/5, 10, 11
See application file for complete search history.

(56) References Cited

U.S. PATENT DOCUMENTS

| 3,108,370 | A |  | 10/1963 | Peickii et al. |
| 3,180,648 | A |  | 4/1965 | Kupfert et al. |
| 4,762,189 | A | * | 8/1988 | Tatum ............. E21B 10/25 175/371 |
| 5,009,519 | A | * | 4/1991 | Tatum ............. E21B 10/25 175/372 |
| 5,286,039 | A |  | 2/1994 | Kawaguchi et al. |
| 6,047,969 | A |  | 4/2000 | Hoefft et al. |
| 6,634,929 | B1 |  | 10/2003 | Visser |
| 6,684,480 | B2 |  | 2/2004 | Conrad |
| 7,534,159 | B2 |  | 5/2009 | Nomura et al. |

(Continued)

FOREIGN PATENT DOCUMENTS

| DE | 19502466 | 8/1996 |
| FR | 2526849 | 11/1983 |

OTHER PUBLICATIONS

Patent Cooperative Treaty PCT/US2017/027357 International Search Report dated Jun. 22, 2017 (15 pages).

*Primary Examiner* — Eileen P Morgan
(74) *Attorney, Agent, or Firm* — Rickard K. DeMille; Rebecca L. Henkel

(57) ABSTRACT

A method for manufacturing a face seal may generally include positioning a machining device relative to the face seal such that the face seal is compressed between a machining surface of the machining device and a support member on which the face seal is supported. In addition, the method may include removing material from a seal flange of the face seal using the machining device while the face seal remains compressed between the machining device and the support member and monitoring a compressive load applied through the face seal as material is being removed from the seal flange. Moreover, the method may include adjusting the operation of the machining device to prevent further removal of material from the seal flange when the monitored compressive load is equal to a predetermined load setting.

12 Claims, 11 Drawing Sheets

(56) References Cited

U.S. PATENT DOCUMENTS

| | | |
|---|---|---|
| 7,762,824 B2 | 7/2010 | Smith, III |
| 8,201,832 B2 | 6/2012 | Kocurek |
| 9,109,732 B2 | 8/2015 | Vu |
| 2002/0163133 A1 | 11/2002 | Bedford et al. |
| 2012/0161500 A1 | 6/2012 | Vik |
| 2013/0209295 A1* | 8/2013 | Ramos ............... F04D 29/106 |
| | | 417/437 |
| 2015/0147012 A1 | 5/2015 | Scancarello |

* cited by examiner

SYSTEM AND METHOD FOR MANUFACTURING A FACE SEAL WITH CONTROLLED LOAD TOLERANCE

FIELD OF THE INVENTION

The present subject matter relates generally to face seals and, more particularly, to a system and method for manufacturing face seals that reduces the load variability in the face loads for the resulting face seals.

BACKGROUND OF THE INVENTION

Axial face seals (or "face seals") are used to seal two relatively rotating bodies against each other. Face seals keep dirt and other contamination from reaching sensitive parts of a machine, such as bearings, and are also used to retain fluid within a fluid-filled housing. Typically, face seals are designed to be mounted and assembled as pairs in a face-to-face relationship to form a face seal set, with the two sealing rings (typically highly polished metal rings) facing each other and rotating relative to one another. Each face seal also includes an elastomeric load ring extending around the outer perimeter of its sealing ring.

In many instances, face seals may be used with rubber-tracked vehicles having high travel speeds, which, in turn, produce high face seal temperatures due to the high circumferential face speeds. As is generally understood, the sealing capability of a face seal is limited by the heat generated between the adjacent sealing faces of the assembled face seal set. The amount of heat generated between the sealing faces is generally a function of the face speed and the face load for the face seal. While the face speed is typically known or can be easily determined, the face load for a face seal can vary significantly due to current manufacturing tolerances. For instance, due to variations in the elastomeric load rings (e.g., in the material properties), the current industry standard for tolerance on the face load for a face seal is +/−30% of the nominal face load. Due to the high variability in the face load, current face seals must be designed to perform properly when the face load is 30% less than nominal, and still not overheat when the face load is 30% higher than nominal. This often results in face seals being overdesigned to accommodate the load variability, which is inefficient and uneconomical.

Accordingly, a system and method for manufacturing face seals that reduces the load variability of the resulting face seals would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for manufacturing a face seal that includes a sealing ring having a seal flange and an inner body portion. The face seal also includes an elastomeric load ring positioned around an outer perimeter of the inner body portion of the sealing ring. The method may generally include positioning a machining device relative to the face seal such that the face seal is compressed between a machining surface of the machining device and a support member on which the face seal is supported. In addition, the method may include removing material from the seal flange using the machining device while the face seal remains compressed between the machining device and the support member and monitoring a compressive load applied through the face seal as material is being removed from the seal flange. Moreover, the method may include adjusting the operation of the machining device to prevent further removal of material from the seal flange when the monitored compressive load is equal to a predetermined load setting.

In another aspect, the present subject matter is directed to a system for manufacturing a face seal that includes a sealing ring having a seal flange and an inner body portion. The face seal also includes an elastomeric load ring positioned around an outer perimeter of the inner body portion of the sealing ring. The system may generally include a support member configured to support the face seal and a machining device movable relative to the support member to a machining position at which the face seal is compressed between a machining surface of the machining device and the support member. The machining device may be configured to remove material from the seal flange while being maintained at the machining position. The system may also include a load sensor configured to monitor a compressive load being applied through the face seal as material is being removed from the seal flange using the machining device. Additionally, the operation of the machining device may be configured to be adjusted when the monitored compressive load is equal to a predetermined load setting to prevent further removal of material from the seal flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
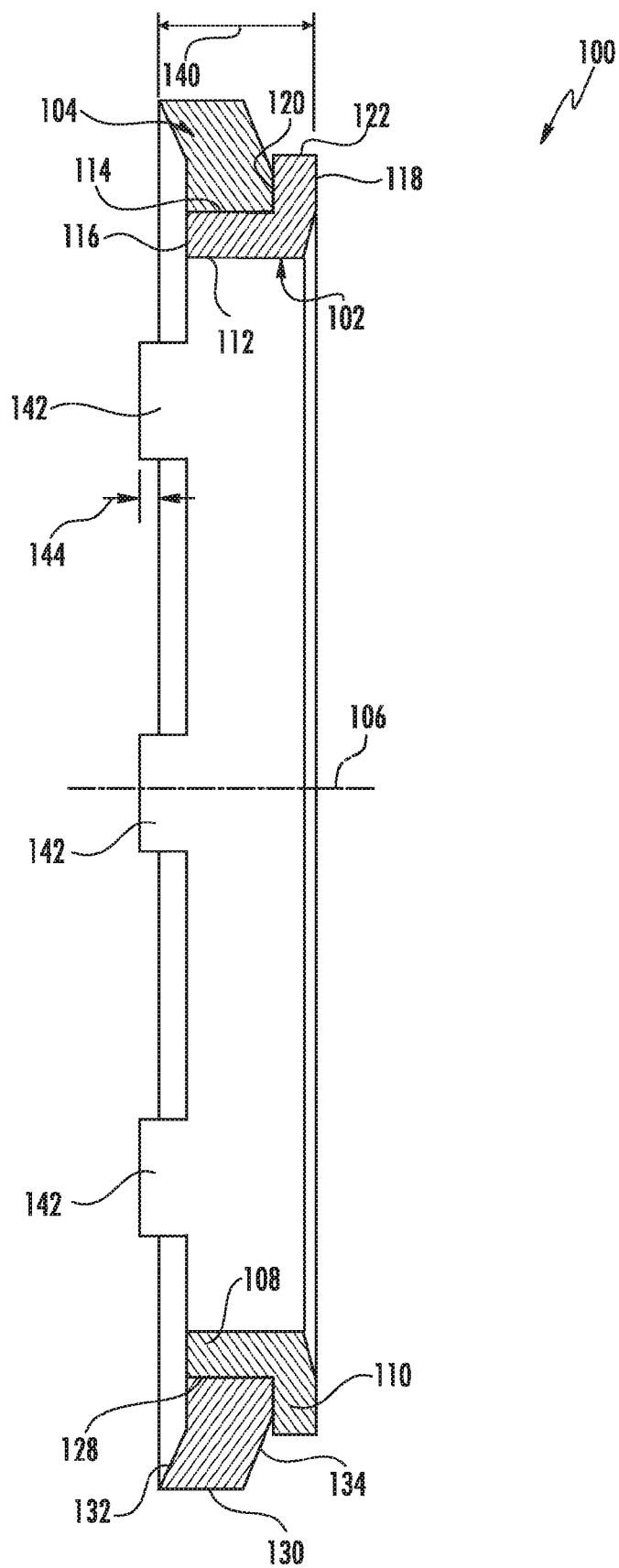
FIG. 1 illustrates a cross-sectional view of one embodiment of a face seal in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for manufacturing face seals with controlled load tolerances. Specifically, in several embodiments, the disclosed system and method may allow for face seals to be machined in a manner that provides for consistent face loads despite variations in the material properties of the elastomeric load rings used included with face seals. For example, as will be described below, a grinding wheel may be positioned relative to a support surface on which a face seal to be machined is supported such that the grinding wheel is spaced apart from the support surface by a predetermined distance corresponding to the desired axial width for the face seal. In such an embodiment, the face seal may be compressed between the grinding wheel and the support surface. The grinding wheel may then be rotated relative to the face seal to grind down or otherwise remove material from the seal flange of the face seal. As the thickness of the seal flange is reduced, the reactive spring force provided by the compressed elastomeric load ring as it expands with reductions in the flange thickness may result in the seal flange being pushed outwardly in the direction of the grinding wheel, thereby allowing the grinding wheel to continue removing material from the seal flange while being maintained at its fixed machining position. Additionally, during the machining process, the compressive load being applied through the face seal may be continuously monitored (e.g., via a load sensor) and compared to a predetermined load setting corresponding to the desired face load for the face seal. As such, when the monitored compressive load is equal to the predetermined load setting, the machining operation may be terminated to prevent further material from being removed from the face seal. Such a methodology may allow for face seals to be manufactured that have significantly reduced load variations as compared to the current industry standard for face load tolerance.

Figure 2:
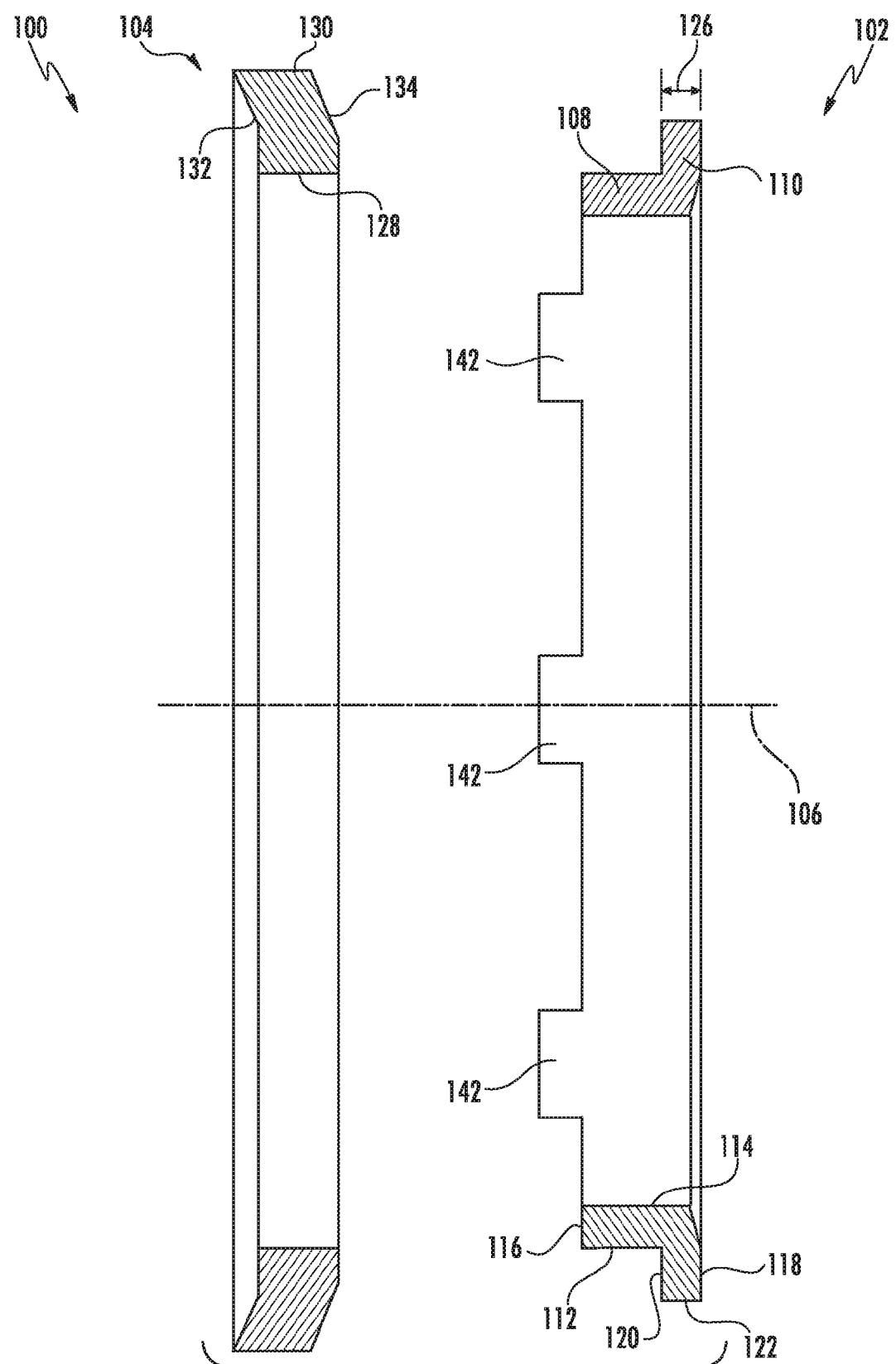
FIG. 2 illustrates a cross-sectional, exploded view of the components of the face seal shown in FIG. 1.
Figure 3:
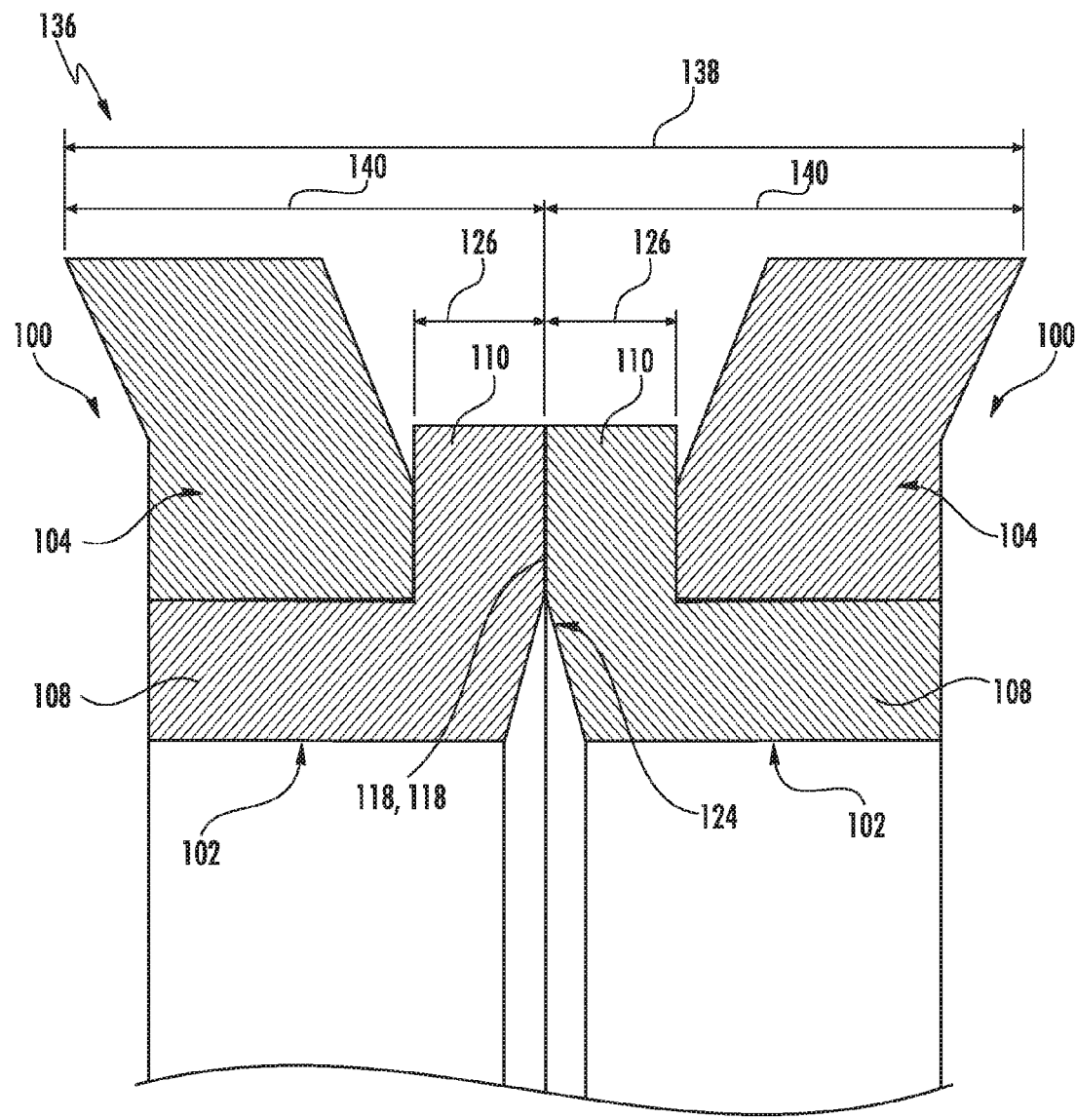
FIG. 3 illustrates a partial, cross-sectional view of two face seals identical to the face seal shown in FIG. 1, particularly illustrating the face seals provided in a face-to-face relationship relative to one another in accordance with aspects of the present subject matter.

Referring now to FIGS. 1-3, several views of one embodiment of a mechanical face seal(s) 100 are illustrated in accordance with aspects of the present subject matter. Specifically, FIG. 1 illustrates a cross-sectional view of the face seal 100 and FIG. 2 illustrates a cross-sectional, exploded view of the face seal 100 shown in FIG. 1. Additionally, FIG. 3 illustrates a partial, cross-sectional view of two face seals 100 positioned face-to-face relative to one another, with each face seal 10 having the same configuration as the face seal 100 shown in FIGS. 1 and 2.

As shown in the illustrated embodiment, the disclosed face seal 100 may generally include a metallic sealing ring 102 and an elastomeric load ring 104. In general, the sealing ring 102 may be positioned along the radially inner side of the face seal 100 (i.e., closest to a central axis 106 associated with the seal face 100). As shown in FIGS. 1 and 2, in several embodiments, the sealing ring 102 may include an inner cylindrical or body portion 108 extending axially generally parallel to the central axis 106 and a planar seal flange 110 extending radially generally perpendicular to the central axis 106. In such embodiments, the inner body portion 108 and the seal flange 110 of the sealing ring 102 may generally form an "L-shaped" cross-section.

As particularly shown in FIG. 2, the inner body portion 108 of the sealing ring 102 may include an outer cylindrical wall 112, an inner cylindrical wall 114 and a radial edge 116 extending between the outer and inner cylindrical walls 112, 114. In one embodiment, the outer cylindrical wall 112 may be spaced apart from the inner cylindrical wall 114 by a generally constant radial distance along the axial length of the inner body portion 108.

Additionally, as shown in FIG. 2, the seal flange 110 of the sealing ring 102 may correspond to a generally planar disk having a radially extending seal-side wall 118, a radially extending non-seal-side wall 120, and an outer cylindrical edge 122 extending axially between the opposed walls 118, 120. In one embodiment, the seal-side wall 118 may define a sealing surface that is configured to engage a corresponding mating surface of an adjacent face seal 100. For instance, such an arrangement is shown in FIG. 3, which illustrates a partial view of two identical face seals 100 provided in a face-to-face relationship relative to one another such that the seal-side wall 118 of each face seal 100 is positioned directly against or adjacent to the seal-side wall 118 of the adjacent face seal 100. As such, a sealing interface 124 may be defined between the adjacent face seals 100 between their respective seal-side walls 118.

It should be appreciated that, in general, the seal-side wall 118 of the seal flange 110 may be substantially planar. However, when a pair of opposing face seals 100 is assembled relative to a wheel assembly, the seal-side wall 118 of each face seal 100 may be configured to deflect slightly in a known way to encourage the flow of lubricating oil in-between the two opposing seal-side walls 118.

It should also be appreciated that the seal flange 110 may generally define a thickness 126 between its opposed walls 118, 120. As will be described below, the thickness 126 of the seal flange 110 may be reduced by removing material from the seal-side wall 118 of the seal flange 110. For example, in one embodiment, a grinding device or other suitable machining device may be used to grind down the seal-side wall 118 along its planar surface to reduce the thickness 118 of the seal flange 110.

Referring still to FIGS. 1-3, the elastomeric load ring 104 may generally be configured to be positioned around an outer perimeter of the inner body portion 108 of the sealing ring 102. As particularly shown in FIG. 2, the elastomeric load ring 104 may include an inner cylindrical wall 128, an outer cylindrical wall 130, and first and second sidewalls 132, 134 extending between the opposed cylindrical walls 128, 130. In general, the inner cylindrical wall 128 may be configured to be positioned against or adjacent to the outer cylindrical wall 112 of the sealing ring 102. In one embodiment, the inner cylindrical wall 128 may be retained against the outer cylindrical wall 112 of the sealing ring 102 via friction. Alternatively, the inner cylindrical wall 112 may be bonded or otherwise coupled to the outer cylindrical wall 112 of the sealing ring 102.

It should be appreciated that the elastomeric load ring 104 may generally be formed from any suitable material. In one embodiment, the composition of the elastomeric load ring 104 may be a polymer having high temperature resistance, which may allow for the disclosed face seal 100 to be advantageously used for high speed/temperature applications, such as within rubber-tracked undercarriages for a work vehicle. In a particular embodiment, the polymer used to form the elastomeric load ring 104 may be a fluoropolymer, preferably a fluoroelastomer, and more preferably a dipolymer or terpolymer of vinylidene fluoride and hexafluoropropylene, or vinylidene fluoride, hexafluoropropylene and tetrafluoroethylene.

It should also be appreciated that, when the face seal 100 is assembled in a face-to-face relationship with another face seal 100 (e.g., as shown in FIG. 3) to form a face seal set 136, the seal set 136 may generally define a predetermined operating width 138 corresponding to the maximum axial width defined between the axially outermost surfaces or edges of the elastomeric load rings 104, which may vary depending on the specific wheel assembly or other assembly within which the face seal set 136 is being utilized. As such, each face seal 100 may be configured to define a desired axial width 140 corresponding to one-half of the predetermined operating width 138 of the face seal set 126. For instance, as shown in FIG. 3, the desired axial width 140 of each face seal 100 may be defined between the seal-side wall 118 of each seal flange 110 and the axially outermost surface or edge of each elastomeric load ring 102. As will be described below, the desired axial width 140 of each face seal 100 may be used as a setpoint for positioning a machining device relative to the face seal 100 when machining the seal flange 110.

Additionally, in accordance with aspects of the present subject matter, the face seal 100 may also be configured to include one or more anti-rotation features configured to engage a corresponding anti-rotation feature(s) of a support member configured to support the face seal 100 during the performance of the disclosed machining process. For instance, as particularly shown in FIGS. 1 and 2, the face seal 100 may include one or more projections or tabs 142 extending axially from the radial edge 116 of the inner body portion 108 in a direction away from the seal flange 110 such that the tabs 142 extend beyond the axially outermost edge of the elastomeric load ring 104 by a given axial distance 144. As will be described below, the axial tab(s) 142 may be configured to be received within a corresponding recess(es) defined in the support member to prevent rotation of the face seal 100 relative to the support member as the seal flange 110 is being machined. However, in other embodiments, the face seal 100 may include any other suitable feature(s) configured to engage a corresponding feature(s) of the support member so as to prevent relative rotation between such components.

Figure 4:
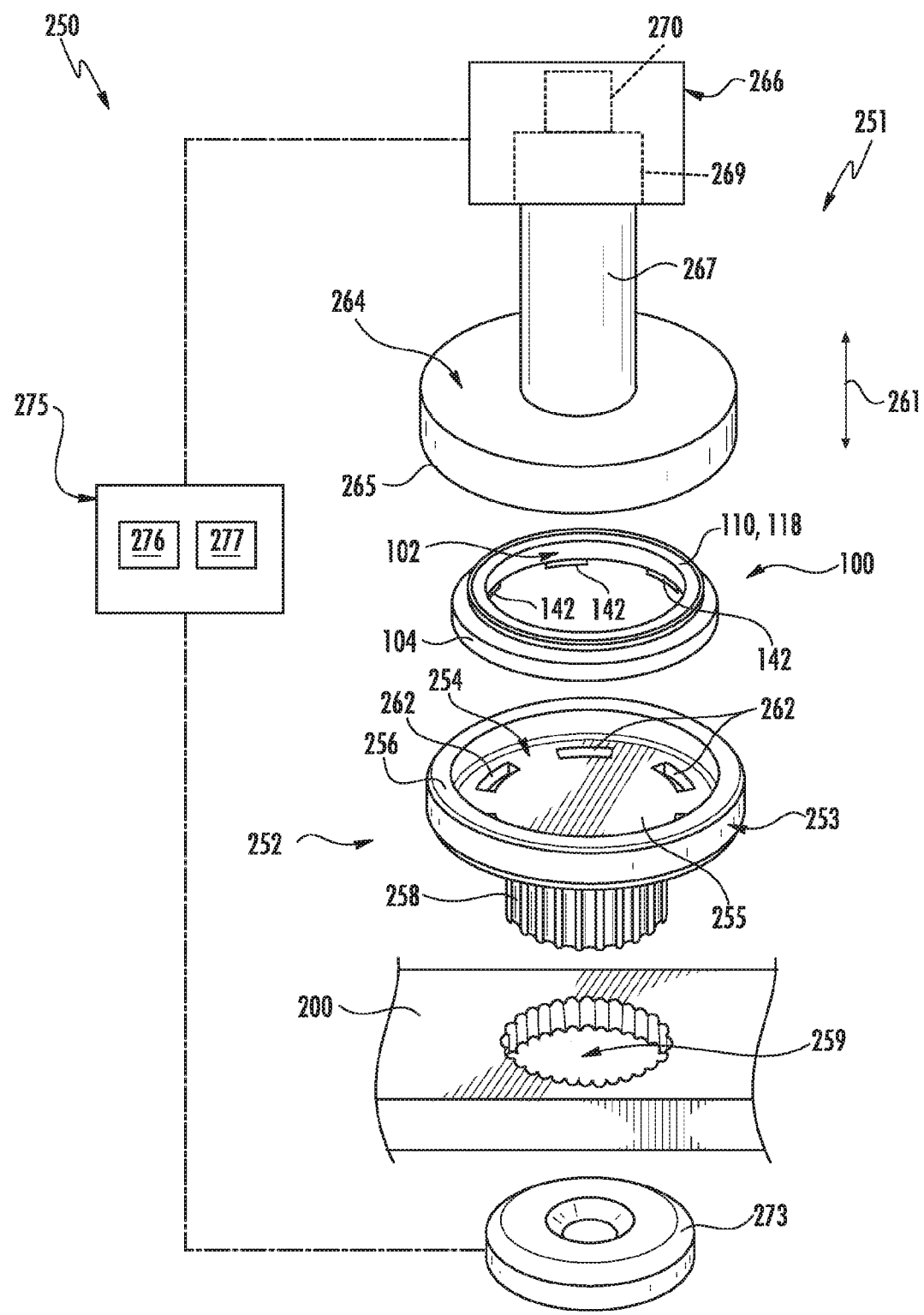
FIG. 4 illustrates an exploded view of one embodiment of a system for manufacturing a face seal in accordance with aspects of the present subject matter.
Figure 5:
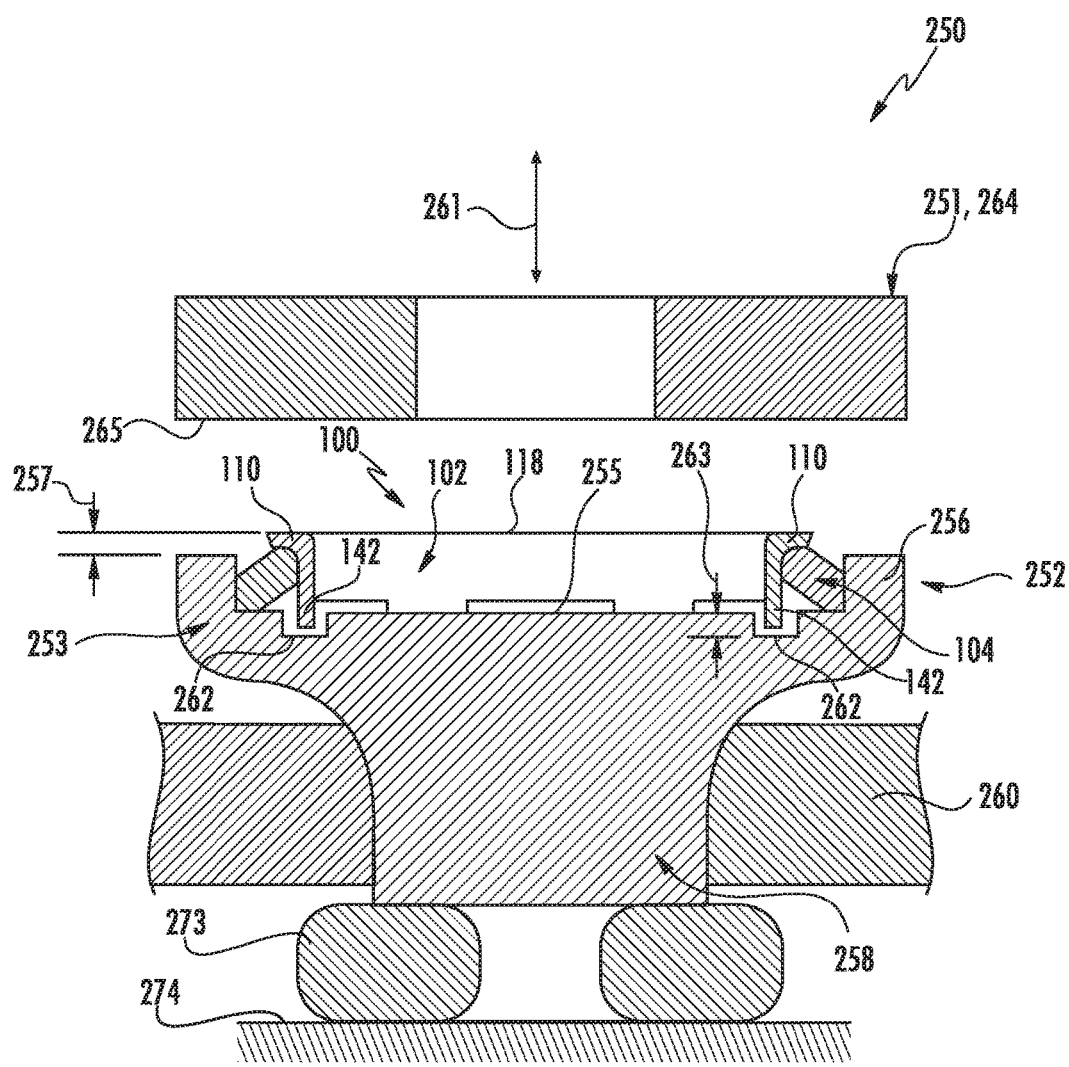
FIG. 5 illustrates an assembled, cross-sectional view of the system components shown in FIG. 4, particularly illustrating a grinding wheel of the system located at a raised position relative to the face seal to be machined.
Figure 6:
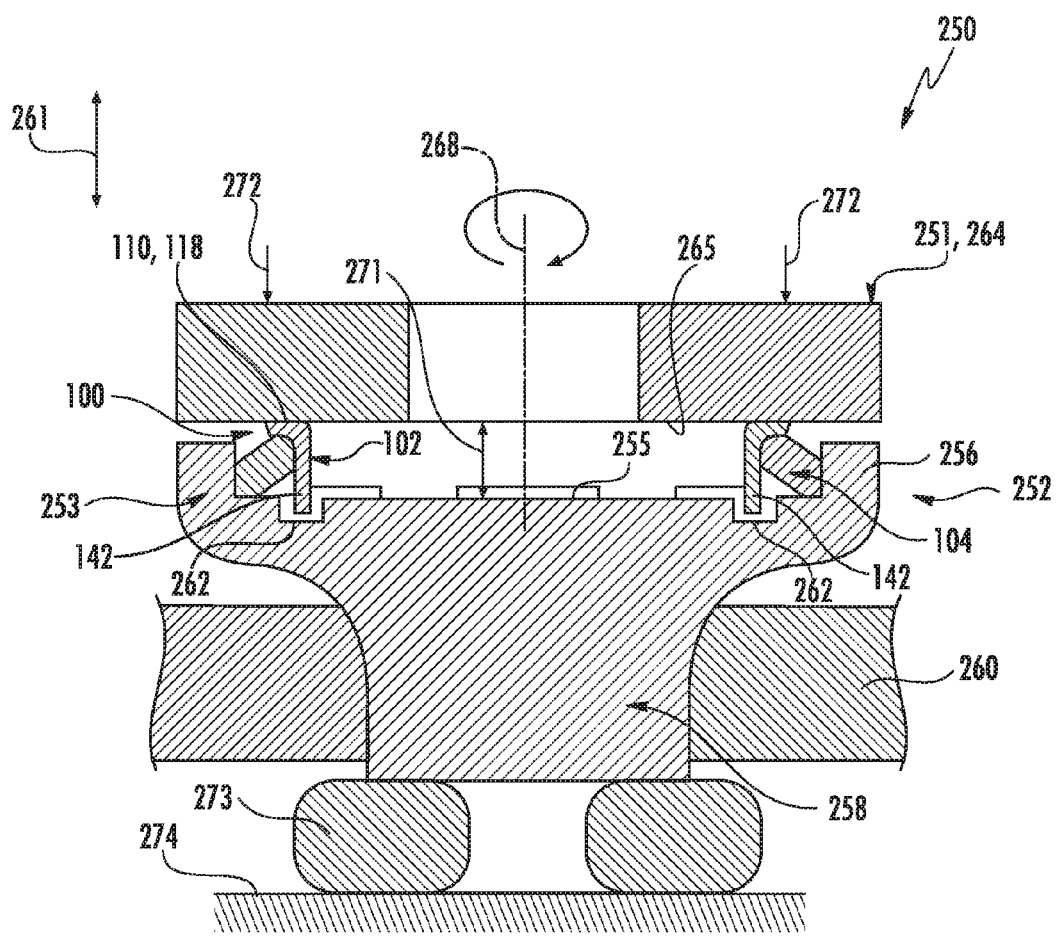
FIG. 6 illustrates another assembled, cross-sectional view of the system components shown in FIG. 4, particularly illustrating the grinding wheel located at a machining position relative to the face seal to be machined.

Referring now to FIGS. 4-6, one embodiment of a system 250 for manufacturing a face seal is illustrated in accordance with aspects of the present subject matter. Specifically, FIG. 4 illustrates an exploded, perspective view of various system components of the disclosed system 250. Additionally, FIGS. 5 and 6 illustrate cross-sectional views of the system components shown in FIG. 4 as assembled, particularly illustrating a portion of a machining device 251 of the system 250 being actuated between a raised position (FIG. 5) and a machining position (FIG. 6).

In several embodiments, the system 250 may include one or more support members 252 configured to support a face seal 100 to be machined relative to a corresponding machining device 251. As shown in the illustrated embodiment, the system 250 includes a mandrel-type support member 252 having a support portion 253 at one end that defines an open-ended seal cup or cavity 254 (FIG. 4) for receiving the face seal 100. As shown in FIGS. 4-6, the support portion 253 of the support member 252 may include both a support surface 255 and a cylindrical wall 256 extending outwardly from the support surface 255 so as to define the open-ended seal cavity 254. In such an embodiment, the face seal 100 may be configured to be positioned within the seal cavity 254 such that a portion of the elastomeric ring 104 of the face seal 100 is in contact with and is supported by the support surface 255, with at least a portion of the seal flange 110 being positioned exterior to the seal cavity 254. For example, as shown in FIG. 5, the seal flange 110 may extend outwardly from the seal cavity 254 a given distance 257 to allow the machining device 251 to be used to machine the flange 110 without contacting the cylindrical wall 256.

It should be appreciated that, in alternative embodiments, the support portion 253 of the support member 252 may have any other suitable configuration that allows it to support a face seal 100 as it is being machined. For instance, as opposed to including a cylindrical wall 256 defining a seal cavity 254, the support portion 253 may simply define a planar support surface 255 for supporting the face seal 100.

Additionally, the support member 252 may also include a mounting portion 258 at its opposed end for coupling the support member 252 to a separate component of the system 250, such as a component of a stationary fixture. For example, as shown in FIG. 4, the mounting portion 258 of the support member 252 may define a toothed or ridged profile around its outer perimeter that is configured to be received within a corresponding toothed or ridged opening 259 defined through a stationary fixture plate 260. In such an embodiment, the toothed/ridged engagement provided between the support member 252 and the fixture plate 260 may allow the support member 252 to move relative to the fixture plate 260 in a machine actuation direction of the system 250 (e.g., as indicated by arrow 261 in FIGS. 4-6) while preventing the support member 252 from rotating relative to the fixture plate 260. Thus, the support member 252 may be free to move relative to the fixture plate 260 in the machine actuation direction 261 as the face seal 100 is being machined.

It should be appreciated that, in alternative embodiments, the mounting portion 258 of the support member 252 may have any other suitable configuration that allows it be coupled to a stationary component in a manner that allows for movement of the support member 252 in the machine actuation direction 261 while preventing rotation of the support member 252. For instance, as opposed to the toothed/ridged profile, the mounting portion 258 may have a keyed profile configured to be received within a corresponding keyed opening defined in the fixture plate 260.

Moreover, in several embodiments, the support portion 253 of the support member 252 may include one or more anti-rotation features configured to engage a corresponding anti-rotation feature(s) of the face seal 100, thereby preventing the face seal 100 from rotating relative to the support member 252 as it is being machined. For example, as indicated above, the face seal 100 may include one or more tabs 142 extending axially from the inner body portion 108 of the sealing ring 102. In such an embodiment, one or more corresponding recesses 262 may be defined in the support surface 255 of the support portion 253, with each recess 262 being configured to receive one of the tabs 142. Thus, the tabs 142 may circumferentially engage the corresponding recesses 262 so as to prevent relative rotation between the face seal 100 and the support member 252. As shown in FIG. 5, the recesses 262 may be configured such that a depth 263 of each recess 262 is greater than the axial distance 144 (FIG. 1) defined between ends of the tabs 142 and the axially outermost end of the elastomeric load ring 104. In such an embodiment, the depth 263 may be selected such that each tab 142 does not bottom out or otherwise contact the bottom of its corresponding recess 262 as the face seal 100 is being machined.

It should be appreciated that, in alternative embodiments, any other suitable anti-rotation feature(s) may be used to provide a means for preventing rotation of the face seal 100 relative to the support member 252. For instance, as opposed to directly engaging a portion of the face seal 100 with a portion of the support member 252, a separate locking mechanism or anti-rotation device may be used to prevent the face seal 100 from rotating relative to the support member 252.

Referring still to FIGS. 4-6, as indicated above, the system 250 may also include a machining device 251 configured to perform a machining operation on the face seal 100 that results in the thickness 126 of the seal flange 110 being reduced. Specifically, in several embodiments, the machining device 252 may correspond to a grinding device or similar device configured to remove material from the seal-side wall 118 of the seal flange 110 to reduce the overall thickness 126 of the flange 110. For instance, as shown in the illustrated embodiment, the machining device 251 may include a grinding wheel 264 or other suitable machine head defining a machining surface 265 that is configured to grind down the seal flange 110 when the grinding wheel 264 is rotated relative to the face seal 100. As is generally understood, the grinding wheel 264 may be formed from a composite material including a coarse-particle aggregate that has been pressed and bonded together by a suitable matrix (e.g., a cementing matrix). As such, the coarse-particle aggregate may form an abrasive grinding surface along the exterior of the grinding wheel 264, thereby allowing the wheel 264 to be used to grind down or otherwise remove material from the seal flange 110.

Additionally, the machining device 251 may also include one or more components for actuating or otherwise moving the grinding wheel 264 relative to the face seal 100. For instance, as shown in FIG. 4, the grinding wheel 264 may be coupled to a suitable actuator device 266 via a shaft 267 or other coupling. In several embodiments, the actuator device 266 may be configured to both rotate the grinding wheel 264 about a rotational axis of the machining device 251 (indicated by arrow 268 in FIG. 6) and translate the grinding wheel 264 linearly relative to the face seal 100 in the machine actuation direction 261. As such, the grinding wheel 264 may be moved linearly from a raised position (e.g., as shown in FIG. 5), at which the wheel 264 is spaced apart from the face seal 100, to a machining position (e.g., as shown in FIG. 6), at which the wheel 264 is located at a predetermined position relative to the support member 252 such that the grinding wheel 262 is compressed against and contacts the seal flange 110 of the face seal 100. As will be described below, the grinding wheel 264 may be rotated about its rotational axis 268 while being maintained at its machining position to allow the seal flange 110 to be machined.

It should be appreciated that, in several embodiments, the actuator device 266 may correspond to any suitable device or combination of devices that allows for the grinding wheel 264 to be both rotated about the rotational axis 268 and translated linearly in the machine actuation direction 261. For example, in one embodiment, the actuator device 266 may include both a motor 269 coupled to the shaft 267 for rotating the grinding wheel 264 about the rotational axis 268 and a linear actuator 270 (e.g., a pneumatic, hydraulic, or solenoid activated cylinder, a rack and pinion assembly or any other suitable linear actuator) provided in operative association with the motor 269 and/or shaft 267 that is configured to actuate the grinding wheel 264 in the machine actuation direction 261. In an alternative embodiment, the support member 252 may, instead, be configured to be linearly actuated relative to the machining device 251. In such an embodiment, the actuator device 266 may only be configured rotate the grinding wheel 264 about the rotational axis 268 once the support member 252 has been properly positioned relative to the wheel 264.

As indicated above, the machining position for the grinding wheel 264 may correspond to a preset or predetermined location relative to the support member 252. Specifically, after the face seal 100 to be machined has been installed onto the support member 252, the grinding wheel 264 may be moved relative to the support member 252 in the machine actuation direction 261 (e.g., via the actuator device 266) such that the machining surface 265 of the grinding wheel 264 is spaced apart from the support surface 255 of the support member 252 by a predetermined distance 271 (FIG. 6). In several embodiments, the predetermined distance 271 may correspond to the desired axial width 140 for the face seal 100. In such embodiments, when the grinding wheel 264 is moved to its predetermining machining position, a compressive load (indicated by arrows 272 in FIG. 6) may be applied through the face seal 100 as it is compressed between the grinding wheel 264 and the support member 252. This compressive load may result in the elastomeric load ring 104 being deformed as it is compressed directly between the support surface 255 of the support member 252 and the seal flange 110. With the face seal 100 being compressed down to its desired axial width 140, the actuator device 266 may begin to rotate the grinding wheel 264 to initiate the machining process. As the thickness 126 of the seal flange 110 is reduced, the reactive spring force provided by the compressed elastomeric load ring 104 as it expands with reductions in the flange thickness 126 may result in the seal flange 110 being pushed outwardly in the direction of the grinding wheel 264, thereby allowing the wheel 264 to continue removing material from the seal flange 110 while being maintained at its predetermined machining position.

Additionally, the system 250 may also include a load sensor 273 configured to monitor the compressive load being applied through the face seal 100 as it is being machined. As shown in the illustrated embodiment, the load sensor 273 may, for example, be positioned directly between the support member 252 and a fixed surface 274 such that the mounting portion 258 of the support member 252 is in contact with and supported by the sensor 273 above the fixed surface 274. In such an embodiment, when the grinding wheel 264 is moved to its predetermined machining position and applies a compressive load through the face seal 100, the load may be transmitted through the support member 252 to the load sensor 273 to allow the sensor 273 to monitor the load. Alternatively, the load sensor 273 may be positioned at any other suitable location relative to the face seal 100 that allows the load sensor 273 to detect the compressive load being applied through the face seal 100. For instance, in another embodiment, the load sensor 273 may be positioned at another location along the support/fixture side of the face seal 100, such as by being positioned at the interface defined between the support surface 255 and the face seal 100. In a further embodiment, the load sensor 273 may be positioned at a suitable location along the machine side of the face seal 100, such as by being positioned on or within a component of the machining device 251.

It should be appreciated that the load sensor 273 may generally correspond to any suitable sensor or sensing device configured to detect the compressive load applied through the face seal 100. For instance, in one embodiment, the load sensor 273 may correspond to a compression load cell (e.g., a flat or annular shaped load cell). Alternatively, the load sensor 273 may correspond to any other suitable sensing device configured to function as described herein.

Moreover, as shown in FIG. 4, the system 250 may, in several embodiments, include a controller 275 communicatively coupled to one or more of the system components, such as the machining device 251 and/or the load sensor 273. In general, the controller 275 may correspond to any suitable processor-based device known in the art, such as any suitable computing device and/or any combination of computing devices. Thus, in several embodiments, the controller 275 may include one or more processor(s) 276 and associated memory device(s) 277 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 277 of the controller 275 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 277 may generally be configured to store suitable computer-readable instructions that, when executed by the processor(s) 276, configure the controller 275 to perform various computer-implemented functions, such as the methods and operations described herein. In addition, the controller 275 may also include various other suitable components, such as a communications circuit or module, one or more input/output channels, a data/control bus and/or the like.

In several embodiments, the controller 275 may be configured to automatically control the operation of the machining device 251. For example, the controller 275 may be configured to control the operation of the actuator device 266 such that the grinding wheel 264 is linearly actuated to from a given raised position (FIG. 5) to its predetermined machining position (FIG. 6) after a face seal 100 has been positioned onto the support member 252. In addition, once the grinding wheel 264 has been moved to its machining position, the controller 275 may also be configured to control the operation of the machining device 251 such that the grinding wheel 264 is rotated relative to the face seal 100, thereby allowing the seal flange 110 to be machined down. Similarly, the controller 275 may also be configured to stop the rotation of the grinding wheel 264 and return the wheel 264 to a raised position when the machining operation is completed.

Moreover, the controller 275 may also be configured to monitor the compressive load being applied through the face seal 100 as it is being machined. Specifically, as shown in FIG. 4, the controller 275 may be communicatively coupled to the load sensor 273 such that load measurements generated by the sensor 273 may be transmitted to the controller 275. In such an embodiment, the controller 275 may be configured to compare the monitored compressive load to a predetermined load setting stored within its memory 277. When the compressive load applied through the face seal 100 is equal to the predetermined load, the controller 275 may be configured to automatically adjust the operation of the machining device 251 to prevent further machining of the seal flange 110, such as by stopping the rotation of the grinding wheel 264 and/or by moving the grinding wheel 264 away from the face seal 100 to a raised position.

In several embodiments, the predetermined load setting may correspond to the desired face load for the face seal 100. In such embodiments, when the grinding wheel 264 is initially moved to its predetermined machining position and the face seal 100 is compressed between the wheel 264 and the support member 252, the monitored compressive load will exceed the predetermined load. However, given that the grinding wheel 264 is maintained at the predetermined machining position relative to the support member 252 during the machining process, the elastomeric load ring 104 of the face seal 100 may be allowed to decompress or otherwise expand outwardly while the thickness of the seal flange 110 is being reduced, thereby resulting in a continuous reduction of the compressive load as additional material is removed from the seal flange 110. Thus, by continuously monitoring the compressive load applied through the face seal 100 as the seal flange 110 is being machined, the controller 275 may determine when the monitored load is equal to the predetermined load setting (e.g., the desired face load). At such point, the machining process may be terminated to prevent further material from being removed from the seal flange 110. Thereafter, the machined face seal 100 may be removed from the support member 252 and replaced with another face seal 100. The process may then be repeated to allow the seal flange 110 of the new face seal 100 to be machined until the monitored compressive load is equal to the predetermined load setting. Accordingly, despite any variations in the material properties of the elastomeric load rings 104, each face seal 100 may be machined in a manner that results in a reduced load variation in the face load across a given number of face seals 100.

It should be appreciated that, as an alternative to automatically controlling the operation of the machining device 251 based on the sensor measurements, an operator may manually control the operation of the machining device 251. For instance, the load measurements provided by the load sensor 273 may be displayed on a suitable display device positioned on or in proximity to the machining device 251. In such an embodiment, the operator may view the display device as the seal flange 110 is being machined. When the load displayed on the display device is equal to the predetermined load setting, the operator may adjust the operation of the machining device 251 to terminate the machining process.

Figure 7:
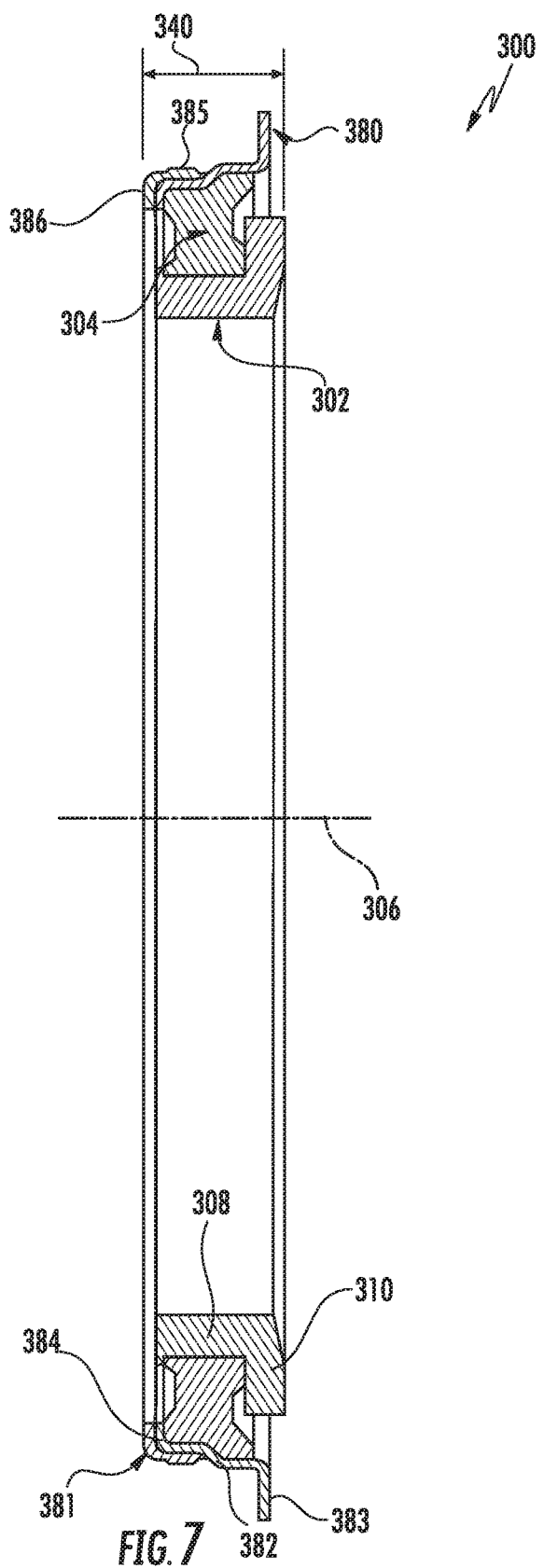
FIG. 7 illustrates a cross-sectional view of another embodiment of a face seal in accordance with aspects of the present subject matter.
Figure 8:
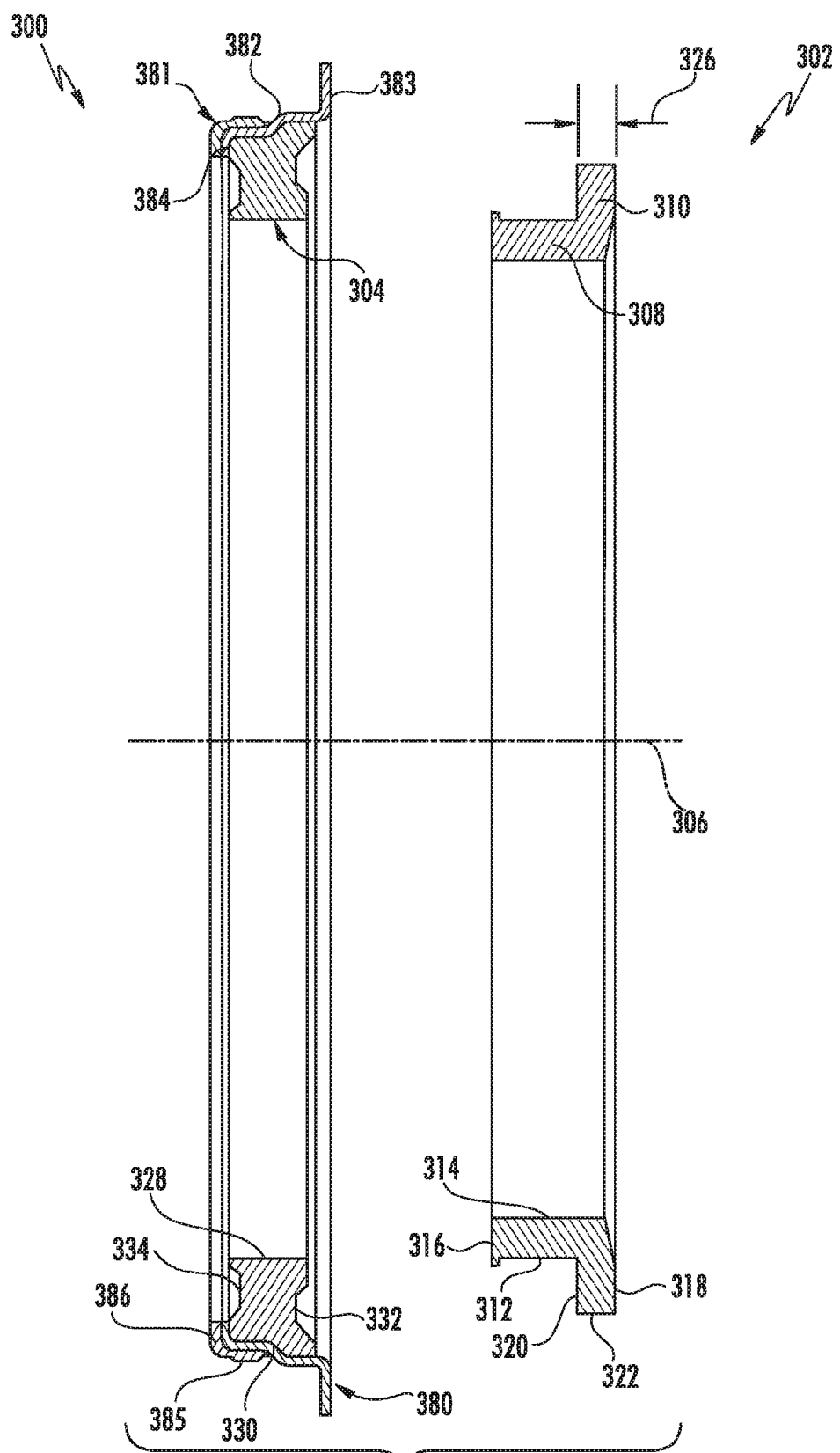
FIG. 8 illustrates another cross-sectional view of the face seal shown in FIG. 7, particularly illustrating one of the seal components of the face seal being exploded away from the remainder of the face seal.
Figure 9:
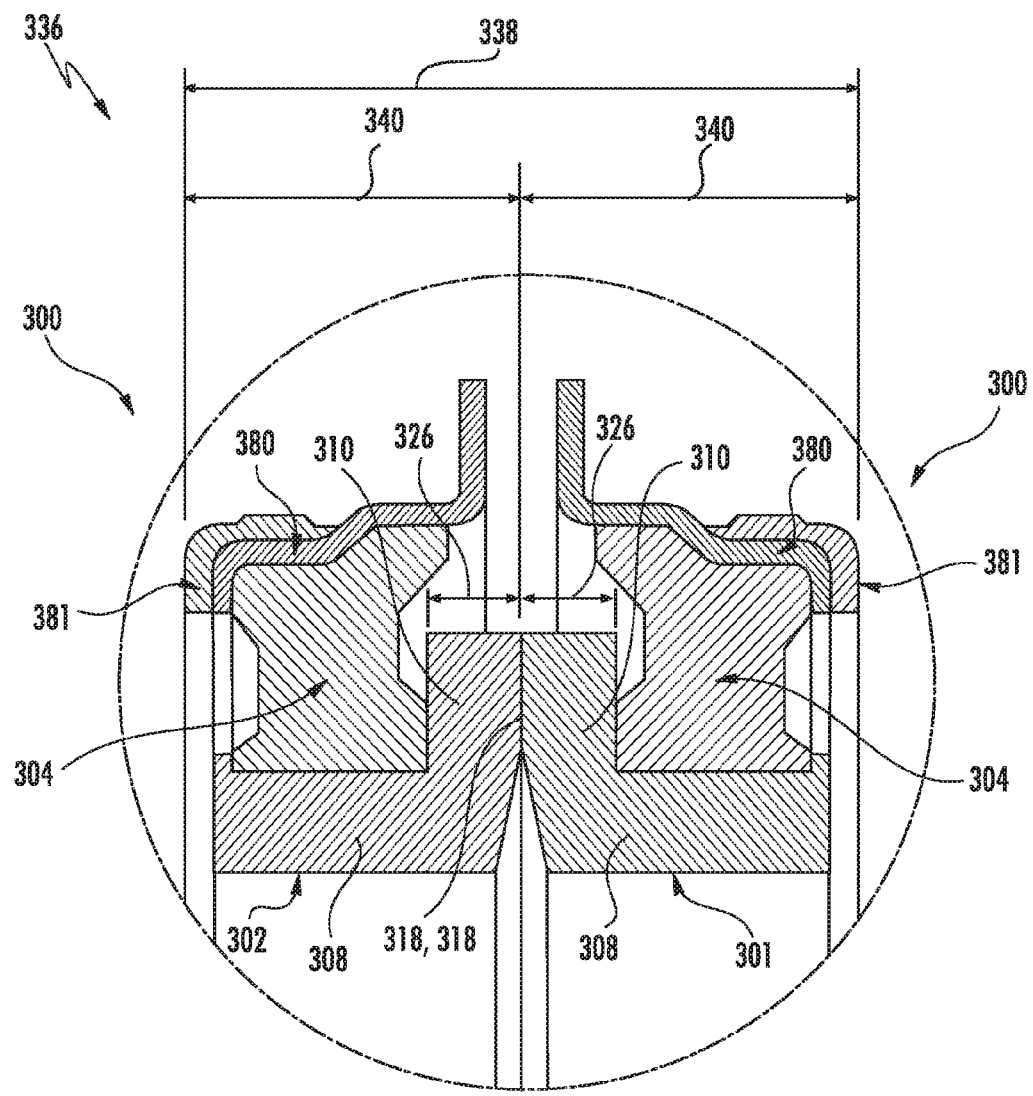
FIG. 9 illustrates a cross-sectional view of two face seals identical to the face seal shown in FIG. 7, particularly illustrating the face seals provided in a face-to-face relationship relative to one another in accordance with aspects of the present subject matter.

It should also be appreciated that the system and method described herein may be utilized to manufacture face seals having any suitable configuration. For example, FIGS. 7-9 illustrate another embodiment of a face seal 300 that may be manufactured in accordance with aspects of the present subject matter. As shown, similar to the face seal 100 described above, the face seal 300 may include both a metallic sealing ring 302 and an elastomeric load ring 304. In general, the sealing ring 302 may be configured the same as or similar to the sealing ring 102 described above. For example, the sealing ring 302 may include an inner body portion 308 extending axially generally parallel to the central axis 306 and a planar seal flange 310 extending radially generally perpendicular to the central axis 306. As particularly shown in FIG. 8, the inner body portion 308 may include an outer cylindrical wall 312, an inner cylindrical wall 314 and a radial edge 316 extending between the outer and inner cylindrical walls 312, 314. Similarly, as shown in FIG. 8, the seal flange 310 may include a radially extending seal-side wall 318, a radially extending non-seal-side wall 320, and an outer cylindrical edge 322 extending axially between the opposed walls 318, 320, with the seal flange 310 defining a thickness 326 between its opposed walls 318, 320.

Additionally, elastomeric load ring 304 may be configured the same as or similar to the elastomeric load ring 104 described above. For instance, as shown in FIG. 8, the elastomeric ring 304 may be configured to be positioned around the outer perimeter of the inner body portion 308 of the sealing ring 302 and may include an inner cylindrical wall 328, an outer cylindrical wall 330, and first and second sidewalls 332, 334 extending between the opposed cylindrical walls 328, 330.

Moreover, in addition to the sealing ring 302 and the elastomeric load ring 304, the face seal 300 may also include an outer sealing ring 380 and an outer elastomeric ring 381. As shown, the outer sealing ring 380 may generally be positioned radially outwardly from the elastomeric load ring 304. In general, the outer sealing ring 380 may include an outer cylindrical portion 382 extending generally axially between a radially extending seating flange 382 at one end and a radially extending backing flange 383 at the other end. In such an embodiment, the outer sealing ring 380 may generally define a "Z-shaped" cross-section.

Further, as shown in the illustrated embodiment, the outer elastomeric ring 381 may generally be configured to extend around a portion of the outer sealing ring 380 to provide a resilient sealing member along a portion of the outer perimeter of the face seal 300. Specifically, as shown in FIGS. 7 and 8, in several embodiments, the outer elastomeric ring 381 may include an axial portion 385 extending axially along the outer cylindrical portion 382 of the outer sealing ring 380 and a radial portion 386 extending radially along the backing flange 384 such that the outer elastomeric ring 381 forms a substantially "L-shaped" cross-section.

It should be appreciated that, when the face seal 300 is assembled in a face-to-face relationship with another face seal 300 (e.g., as shown in FIG. 9) to form a face seal set 336, the seal set 336 may generally define a predetermined operating width 338 corresponding to the maximum axial width defined between the axially outermost surfaces or edges of the outer elastomeric rings 381, which may vary depending on the specific wheel assembly or other assembly within which the face seal set 336 is being utilized. As such, each face seal 300 may be configured to define a desired axial width 340 corresponding to one-half of the predetermined operating width 338 of the face seal set 336. For instance, as shown in FIG. 9, the desired axial width 340 of each face seal 300 may be defined between the seal-side wall 318 of each seal flange 310 and the axially outermost surface or edge of each outer elastomeric ring 381. Similar to the embodiment described above, the desired axial width 340 of each face seal 110 may be used as a setpoint for positioning the machining device 251 relative to the face seal 300 when machining the seal flange 310.

Figure 10:
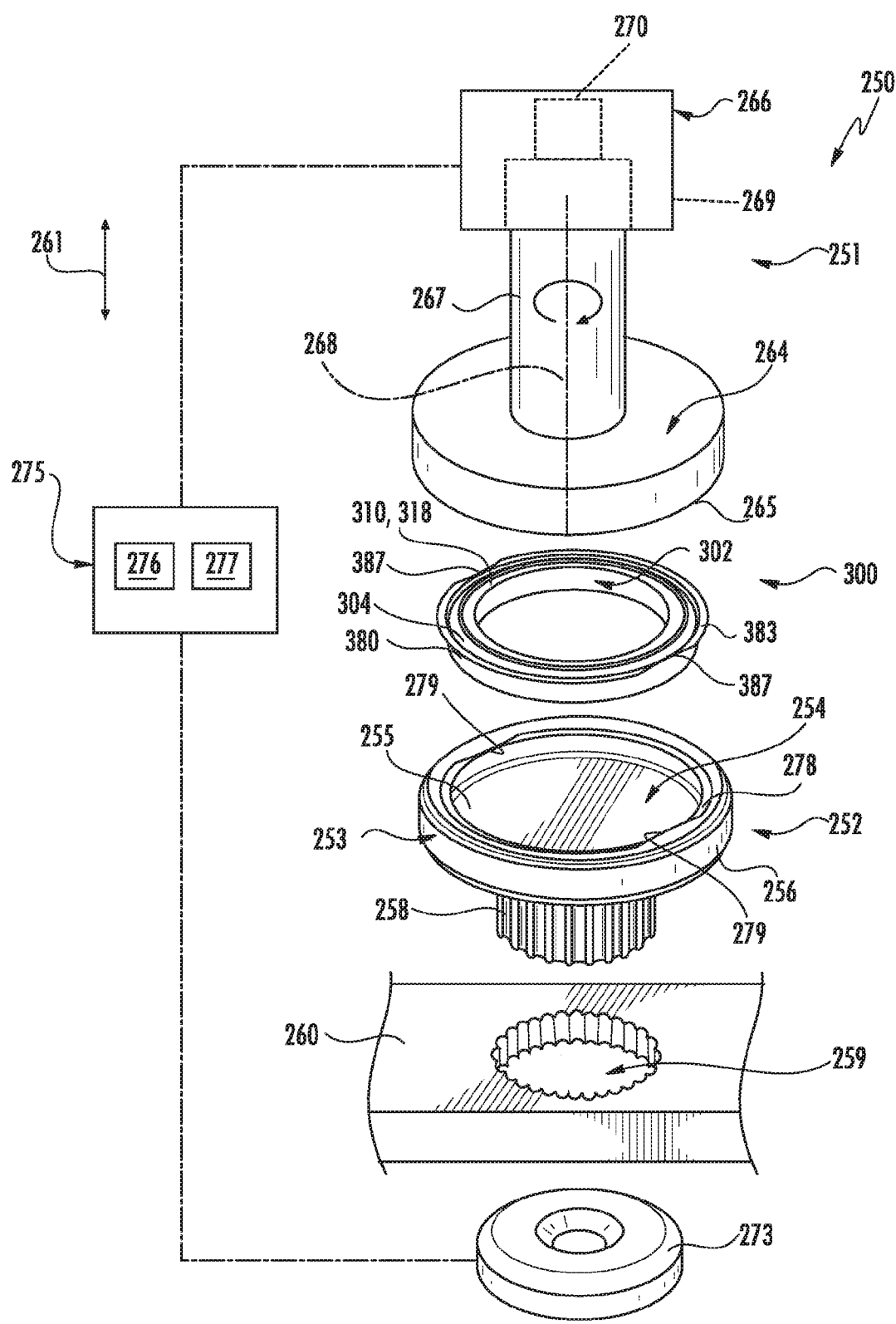
FIG. 10 illustrates an exploded view of another embodiment of a system for manufacturing a face seal in accordance with aspects of the present subject matter.

Referring now to FIG. 10, an exploded view of an alternative embodiment of the system 250 described above with reference to FIGS. 4-6 is illustrated in accordance with aspects of the present subject matter, particularly illustrating the system 250 being used to machine the embodiment of the face seal 300 shown in FIGS. 7-9. As shown in FIG. 10, the various system components may generally be configured the same as or similar to the system components described above. Thus, the same reference characters have been used in FIG. 10 to identify the same or similar features previously described with reference to FIGS. 4-6.

Similar to the embodiment described above, the face seal 300 and the support member 252 may include corresponding anti-rotation features that are configured to prevent rotation of the face seal 300 relative to the support member 251 as the seal flange 310 is being machined using the machining device 251. Specifically, as shown in FIG. 10, a recessed area or shelf 278 may be defined around the inner perimeter of the cylindrical wall 256 of the support member 251 that is configured to receive the seating flange 383 of the outer sealing ring 380 of the face seal 300. In such an embodiment, the shelf 278 and the seating flange 383 may be configured to define corresponding mating or keyed profiles to allow the face seal 300 to circumferentially engage the support member 252. For example, as shown in FIG. 10, the seating flange 383 may include one or more flattened portions 387 around its outer perimeter that are configured to be aligned with corresponding flattened projections 278 extending outwardly from the cylindrical wall 256 relative to the remainder of the shelf 278. As such, when the face seal 300 is installed onto the support member 251, the keyed connection between the shelf/wall 278, 256 of the support member 252 and the seating flange 383 of the face seal 300 may serve to prevent rotation of the face seal 300 relative to the support member 252 as the seal 300 is being machined.

It should be appreciated that, in alternative embodiments, the face seal 300 and the support member 252 may include or incorporate any other suitable anti-rotation features. For instance, similar to the embodiment described above with reference to FIGS. 4-6, the face seal 300 may include tabs extending axially from the sealing ring 302 that are configured to be received within corresponding recesses defined in the support member 252.

Figure 11:
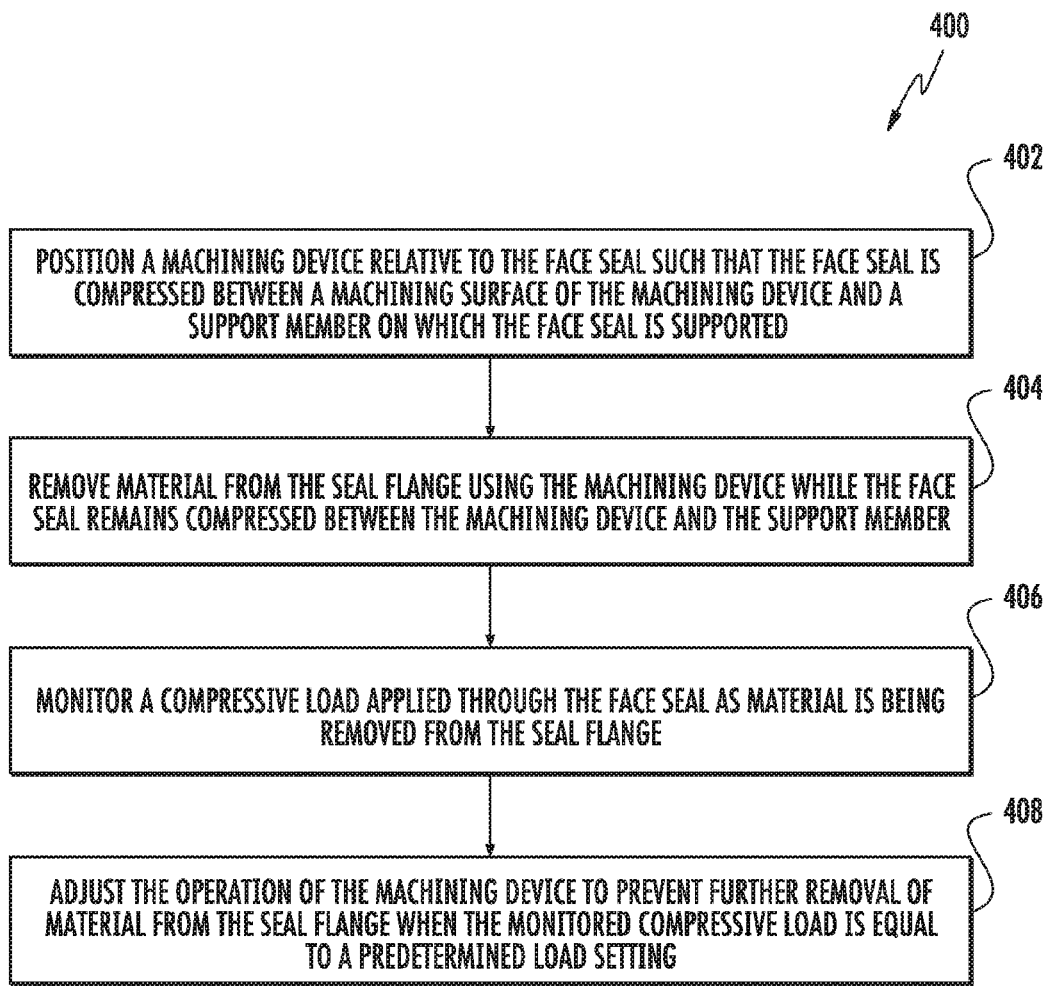
FIG. 11 illustrates a flow diagram of one embodiment of a method for manufacturing a face seal in accordance with aspects of the present subject matter.

Referring now to FIG. 11, a flow diagram of one embodiment of a method 400 for manufacturing a face seal is illustrated in accordance with aspects of the present subject matter. In general, the method 400 will be described herein with reference to the face seal configurations shown in FIGS. 1-3 and 7-9 as well as the embodiments of the system 250 shown in FIGS. 4-6 and 10. However, it should be appreciated by those of ordinary skill in the art that the disclosed method 400 may also be implemented with any other suitable face seal configuration and/or within any other suitable system configuration. In addition, although FIG. 11 depicts steps performed in a particular order for purposes of illustration and discussion, the methods described herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (402), the method 400 may include positioning a machining device relative to the face seal such that the face seal is compressed between a machining surface of the machining device and a support member on which the face seal is positioned. Specifically, as indicated above, the grinding wheel 264 of the machining device 251 may be configured to be actuated to a predetermined machining position relative to the face seal 100, 300 such that the elastomeric load ring 104, 304 of the face seal 100, 300 is compressed between the machining surface 265 of the grinding wheel 264 and the support surface 255 of the support member 252. For example, in one embodiment, the grinding wheel 264 may be linearly actuated against the seal flange 110, 310 of the face seal 100, 200 until the elastomeric load ring 104, 304 is compressed sufficiently such that the distance 271 defined between the machining surface 265 and the support surface 255 is equal to the desired axial width 140, 340 for the face seal 100, 300.

Additionally, at (404), the method 400 may include removing material from the seal flange using the machining device while the face seal remains compressed between the machining device and the support member. Specifically, as indicated above, the grinding wheel 264 of the machining device 251 may be rotated relative to the face seal 100, 300 to grind down or otherwise remove material from the seal flange 110, 310 while the wheel 264 is maintained at the predetermined machining position. Thus, the face seal 100, 300 may remain compressed between the machining device 251 and the support member 252 as the seal flange 110, 310 is being machined.

Moreover, at (406), the method 400 may include monitoring a compressive load applied through the face seal as material is being removed from the seal flange. For example, as indicated above, the disclosed system 250 may include a load sensor 273 configured to monitor the load applied through the face seal 100, 300 as the seal flange 110, 310 is being machined. In one embodiment, the load sensor 372 may be positioned directly below the support member 252 to allow the compressive load transmitted through face seal 100, 300 to be detected. In another embodiment, the load sensor 273 may be positioned at any other suitable location relative to the system components, such as at any other position along the support/fixture side of the face seal 100, 300 (e.g., at the interface between the support member 252 and the face seal 100, 300) or at any position along the machine side of the face seal 100, 300 (e.g., on and/within a component of the machining device 251).

Referring still to FIG. 11, at (408), the method 400 may include adjusting the operation of the machining device to prevent further removal of material from the seal flange when the monitored compressive load is equal to a predetermined load setting. Specifically, as indicated above, when it is determined that the compressive load being applied through the face seal 100, 300 during the machining process has been reduced to or otherwise equals the predetermined load setting, the operation of the machining device 251 may be adjusted to terminate the machining process. For instance, the grinding wheel 264 of the machining device 251 may be moved away from the face seal 100, 300 and/or rotation of the grinding wheel 264 may be stopped to prevent further material from being removed from the seal flange 110, 310. Thereafter, the face seal 100, 300 may be removed from the support member 251 and replaced with another face seal 100, 300. The method 400 (e.g., elements 402-408) may then be repeated for the new face seal 100, 300 to allow its seal flange 110, 310 to be machined in a manner that provides a controlled load tolerance for the face load of the resulting face seal 100, 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a face seal, the face sealing including a sealing ring having a seal flange and an inner body portion, the face seal further including an elastomeric load ring positioned around an outer perimeter of the inner body portion of the sealing ring, the method comprising:
   positioning a machining device relative to the face seal such that the face seal is compressed between a machining surface of the machining device and a support member on which the face seal is supported;
   removing material from the seal flange using the machining device while the face seal remains compressed between the machining device and the support member;
   monitoring a compressive load applied through the face seal as material is being removed from the seal flange; and
   adjusting the operation of the machining device to prevent further removal of material from the seal flange when the monitored compressive load is equal to a predetermined load setting.

2. The method of claim 1, wherein positioning the machining device relative to the face seal comprises moving the machining device relative to the support member to a machining position such that the machining surface is spaced apart from a support surface of the support member by a predetermined distance.

3. The method of claim 2, wherein the predetermined distance corresponds to a desired axial width for the face seal.

4. The method of claim 2, wherein the elastomeric load ring of the face seal is compressed between the support surface of the support member and the sealing ring when the machining device is located at the machining position.

5. The method of claim 2, wherein removing material from the seal flange using the machining device comprises removing material from the seal flange while the machining device is maintained at the machining position.

6. The method of claim 1, further comprising positioning the face seal relative to the support member such that a portion of the face seal engages the support member to prevent rotation of the face seal relative to the support member as material is being removed from the seal flange.

7. The method of claim 6, wherein the sealing ring includes at least one tab extending axially from the inner body portion that is configured to engage a corresponding recess defined in the support member to prevent rotation of the face seal relative to the support member.

8. The method of claim 6, wherein the face seal further comprises an outer sealing ring positioned along an outer perimeter of the elastomeric load ring, the outer sealing ring including a seating flange defining a keyed profile configured to mate with a corresponding keyed profile of the support member to prevent rotation of the face seal relative to the support member.

9. The method of claim 1, wherein adjusting the operation of the machining device to prevent further removal of material from the seal flange comprises at least one of moving the machining surface away from the seal flange or stopping relative rotation between the machining surface and the seal flange when the monitored compressive load is equal to the predetermined load setting.

10. The method of claim 1, wherein the predetermined load setting corresponds to a desired face load for the face seal.

11. The method of claim 1, wherein the machining device comprises a grinding wheel, the machining surface corresponding to an outer surface of the grinding wheel.

12. The method of claim 1, further comprising maintaining the machining surface at a fixed position relative to the support member as material is being removed from the seal flange, the compressive load applied through the face seal being reduced as a thickness of the seal flange is reduced.

* * * * *